W. H. PATE.
MOWER.
APPLICATION FILED NOV. 9, 1917.
1,287,414.
Patented Dec. 10, 1918.
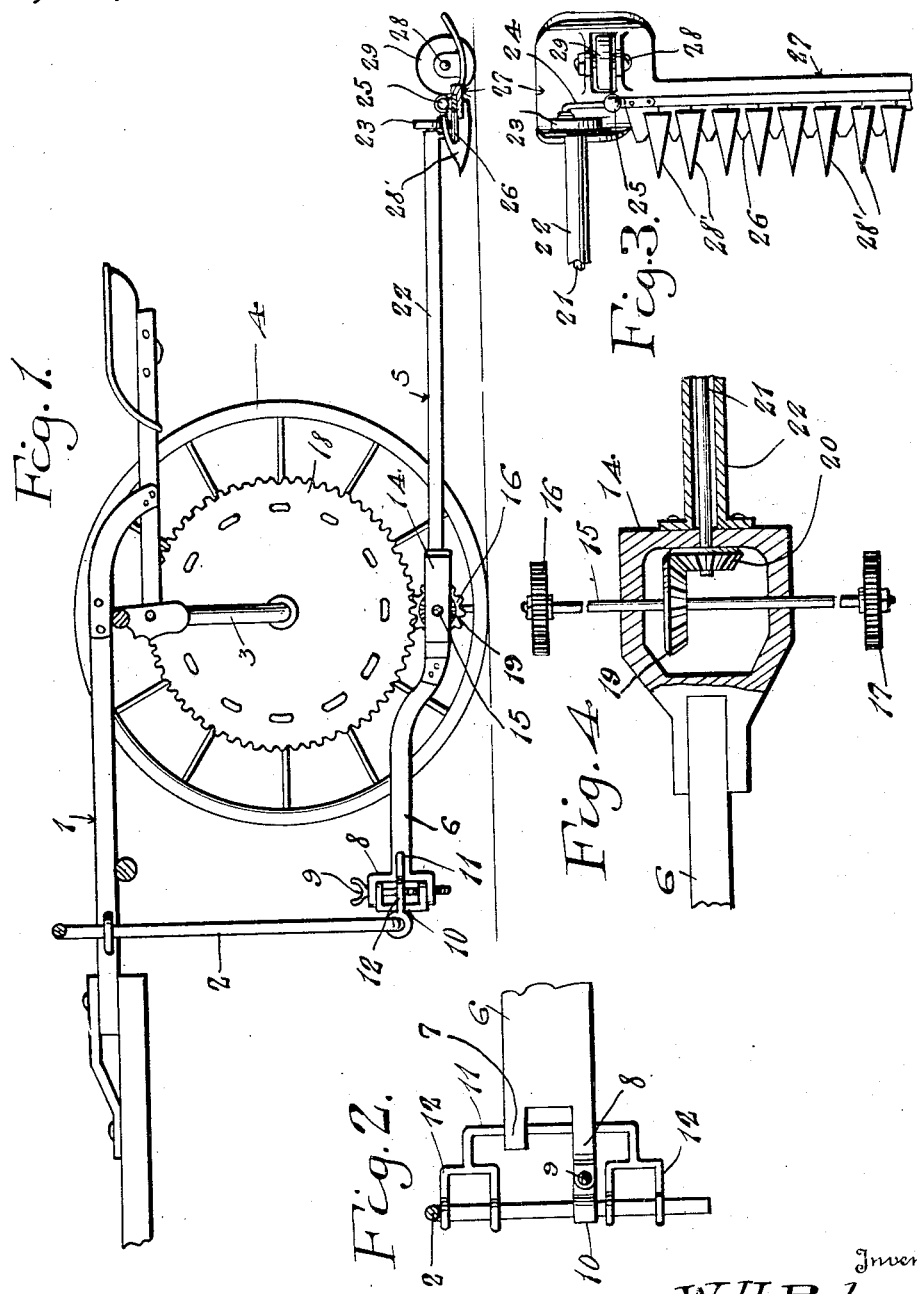
Inventor
W. H. Pate,

UNITED STATES PATENT OFFICE.

WILLIAM H. PATE, OF JEFFERSON, TEXAS, ASSIGNOR OF ONE-HALF TO TURNER F. MOSS, OF AVENGER, TEXAS.

MOWER.

1,287,414.

Specification of Letters Patent.  Patented Dec. 10, 1918.

Application filed November 9, 1917. Serial No. 201,090.

*To all whom it may concern:*

Be it known that I, WILLIAM H. PATE, a citizen of the United States, residing at Jefferson, in the county of Marion and State of Texas, have invented certain new and useful Improvements in Mowers; and I do hereby declare the following to be a full, clear, and exact description of the invention, such as will enable others skilled in the art to which it appertains to make and use the same.

This invention relates to a mowing machine particularly designed for mowing or cutting various types of crops which grow in rows, and which can be cut by a reciprocatory sickle.

An object of the invention is to provide a comparatively simple mower construction which may be attached to a cultivator frame in lieu of one of the shovel carrying standards thereof, and to provide gears one of which is carried by one of the wheels of the cultivator for reciprocating the sickle bar by the travel of the cultivator.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings, wherein like characters designate like and corresponding parts throughout the several views and in which:

Figure 1 is a fragmentary view of the ordinary cultivator showing the improved mower attached thereto.

Fig. 2 is a fragmentary plan view illustrating the manner of connecting the mower to a cultivator.

Fig. 3 is a fragmentary plan view of the cutter bar structure of the mower, and

Fig. 4 is a sectional view illustrating the manner of transmitting the power from one of the supporting wheels of the cultivator shoes to the reciprocatory cutter bar.

Referring more particularly to the drawings, 1 indicates generically the supporting frame of an ordinary cultivator, having its usual beam carrying arch 2, arch axle 3 and the supporting wheels 4. The mower, which is generically indicated by the numeral 5 is attached to the cultivator structure in lieu of one of the shovel carrying beams and it includes a beam 6, which beam has its forward end bifurcated to provide a pair of arms 7 and 8. The arm 8 is attached in the usual manner through the medium of the bolt 9 and the coupler 10 which is carried by the arch 2. The arm 7 supports a bar 11, which bar has a pair of substantially U-shaped resilient members 12 carried by each end of the same which grip portions of the horizontal portion of the arch upon each side of the coupling members 10, as clearly shown in Fig. 2 of the drawings for securely connecting the beam 6 to the cultivator structure.

The beam 6 has a boxing 14 carried by the rear end of the same which rotatably supports a shaft 15. The shaft 15 has a gear 16 mounted upon one end of the same and a second gear 17 mounted upon the opposite end. The gear 16 is provided for meshing with a gear 18 which is attached in any suitable manner to one of the supporting wheels 4 of the cultivator structure. The gear 17 is provided for meshing with a gear 18 carried by one of the supporting wheels of the cultivator when the mower structure is attached to the opposite side of the cultivator to that which is illustrated in Fig. 1.

The shaft 15 has a beveled gear 19 keyed thereupon which meshes with a beveled gear 20. The beveled gear 20 is carried by a shaft 21. A shaft 21 is inclosed in the casing 22 which has its forward end attached to the boxing 14. The shaft 21 has a disk 23 mounted upon its rear end to which is eccentrically connected a pitman rod 24. The pitman 24 is connected by the usual type of ball and socket joint 25 to a reciprocatory sickle bar 26. The sickle bar 26 reciprocates in the usual cutter bar structure indicated at 27 which cutter bar structure has a plurality of pointed guard fingers 28 carried thereby and extending forwardly therefrom. The cutter bar structure 27, has a short axle 28 carried thereby upon which is mounted a wheel 29. The wheel 29 engages the surface of the ground over which the mower is traveling and support the cutter bar structure at the proper elevation.

The gears 16 meshing with the gear 18 will rotate the shaft 15 and through the medium of the beveled gears 18 and 20, this rotation will be imparted through the shaft 21 which rotation will be transmitted through the medium of the disk 23 and the pitman 24 to the sickle bar 26 in a reciprocatory movement, for reciprocating this sickle bar within the guard structure, for the purpose of cutting various sizes of growing crops.

From the foregoing description taken in connection with the accompanying drawings the advantages of construction and the method of operation of the improved mowers, will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with an ordinary cultivator frame including a beam carrying arch, of a mower attachment including a beam, means for detachably connecting said beam to said arch, a reciprocatory sickle bar supported by said beam, and means carried by said beam for rotation by the travel of said cultivator for reciprocating said sickle bar.

2. The combination with an ordinary cultivator frame including supporting wheels, and a beam carrying arch, of a mower attachment for said cultivator comprising a beam, means for detachably connecting said beam to said cultivator arch, a gear carried by one of the wheels of said cultivator, a pinion carried by said beam and meshing with said gear, a shaft extending rearwardly from said beam, a casing surrounding said shaft, means operatively connecting said shaft and said pinion for rotating said shaft upon the rotation of the cultivator wheel, and a reciprocatory sickle bar structure carried by the rear end of said shaft casing and means operatively connecting said reciprocatory sickle to said shaft for reciprocating the sickle upon rotation of the shaft.

3. The combination with an ordinary cultivator frame including beam carrying means and supporting wheels, of a mower means and attachment including a beam, means for detachably connecting said beam to said cultivator beam carrying means, a boxing carried by the rear end of said beam, a shaft rotatably supported by said boxing, a gear mounted upon said shaft, a gear carried by one of the supporting wheels of said cultivator and meshing with said first named gear, a shaft extending rearwardly from said boxing, a casing surrounding said shaft, a reciprocatory sickle bar structure connected to the rear end of said casing, means operatively connecting said rearwardy extending shaft to said boxing carried shaft for rotating the rearwardly extending shaft by the rotation of the first named shaft, means operatively connecting said sickle bar to said rearwardly extending shaft for reciprocating a sickle bar upon rotation of the rearwardly extending shaft.

In testimony whereof I affix my signature in presence of two witnesses.

WILLIAM H. PATE.

Witnesses:
  JOHN MORGASON,
  TOM SHEFFIELD.

Copies of this patent may be obtained for five cents each, by addressing the "Commissioner of Patents, Washington, D. C."